J. C. GALLAGHER & H. P. GARVEY.
COMBINED COOKING AND HEATING STOVE OR RANGE.
APPLICATION FILED MAR. 1, 1911.
1,016,261.
Patented Feb. 6, 1912.
2 SHEETS—SHEET 1.
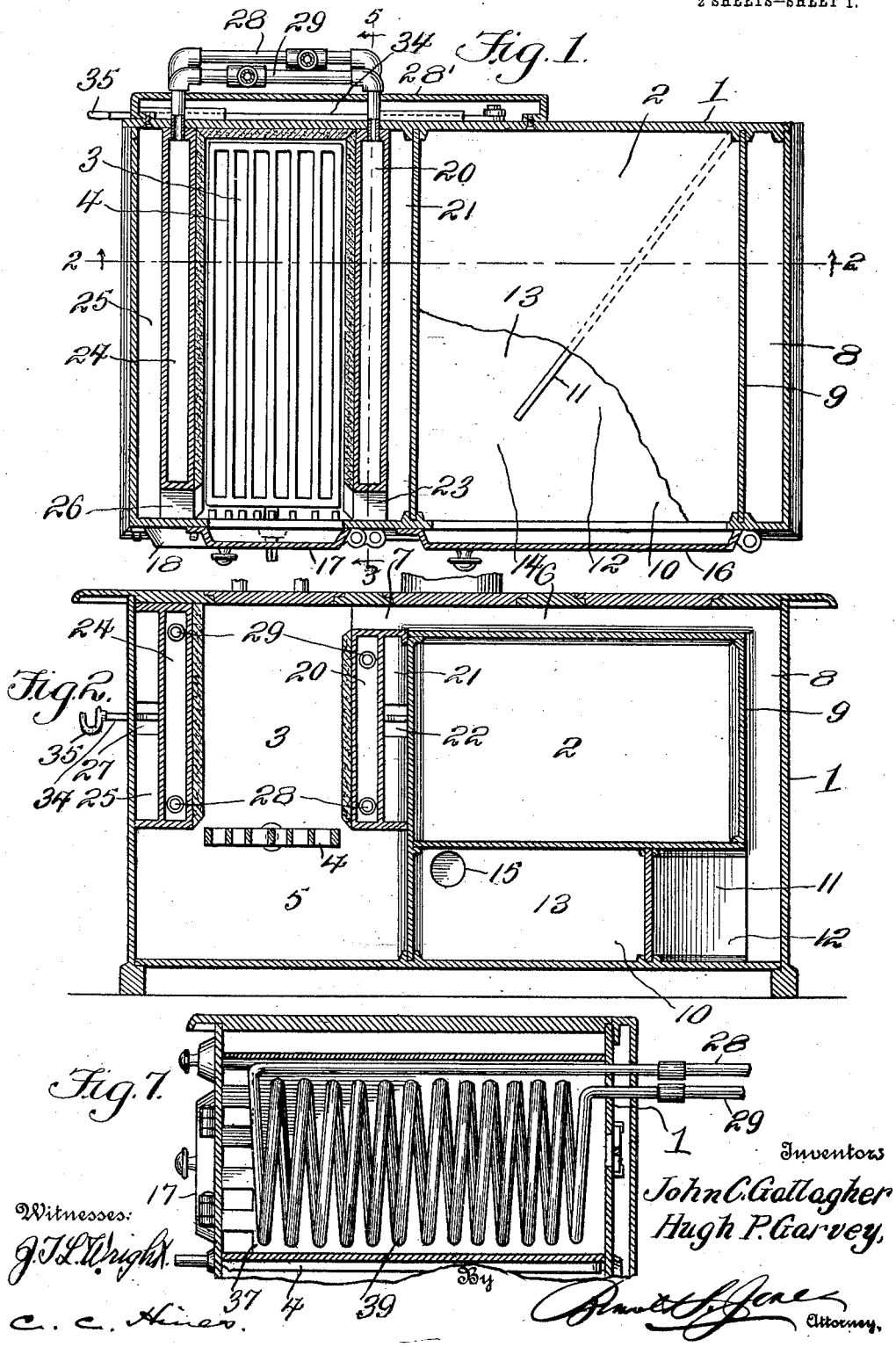

J. C. GALLAGHER & H. P. GARVEY.
COMBINED COOKING AND HEATING STOVE OR RANGE.
APPLICATION FILED MAR. 1, 1911.
1,016,261.
Patented Feb. 6, 1912.
2 SHEETS—SHEET 2.
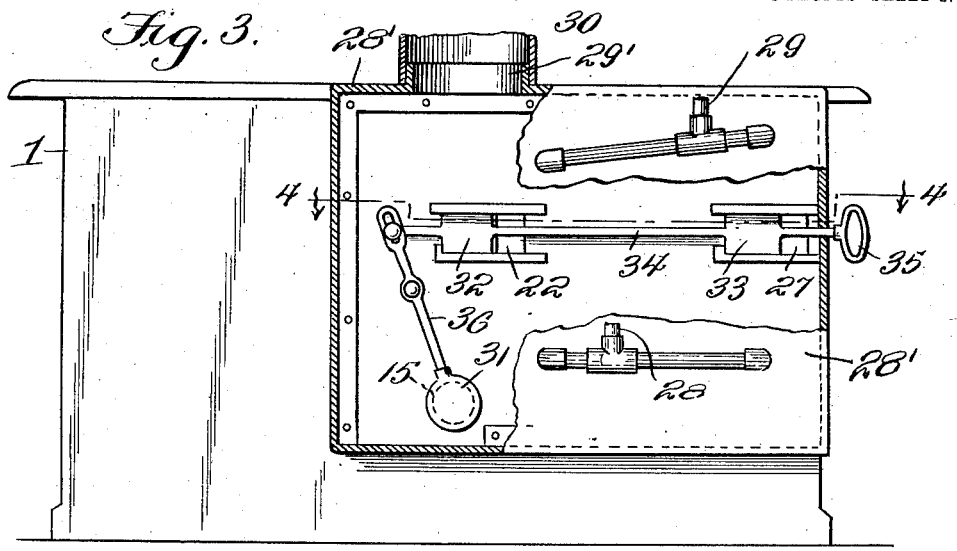
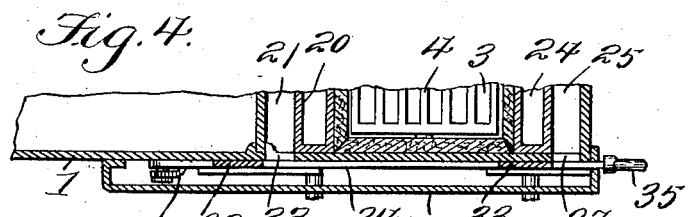
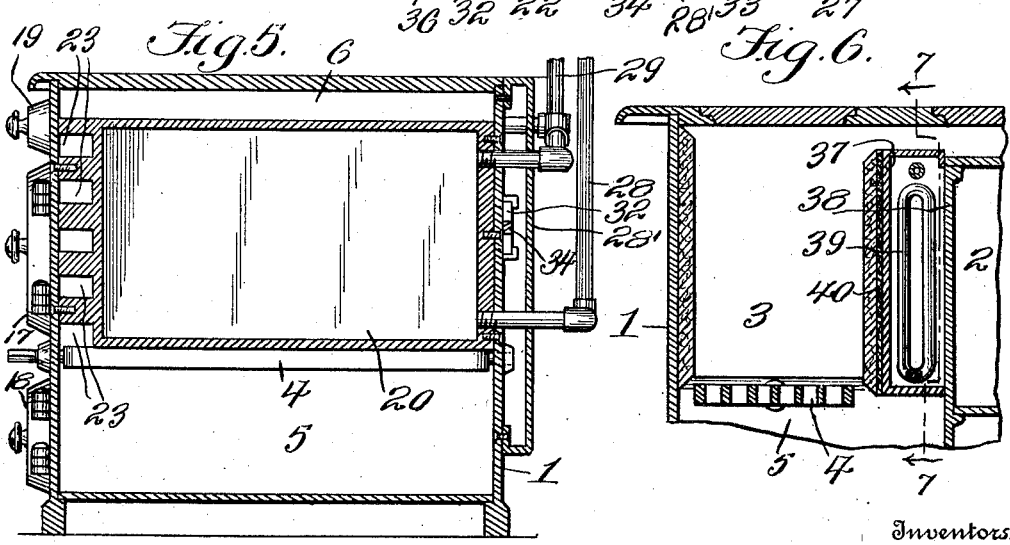
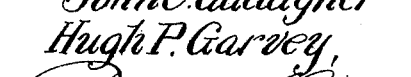

UNITED STATES PATENT OFFICE.

JOHN C. GALLAGHER AND HUGH P. GARVEY, OF PHILADELPHIA, PENNSYLVANIA.

COMBINED COOKING AND HEATING STOVE OR RANGE.

1,016,261.      Specification of Letters Patent.      Patented Feb. 6, 1912.

Application filed March 1, 1911. Serial No. 611,635.

*To all whom it may concern:*

Be it known that we, JOHN C. GALLAGHER and HUGH P. GARVEY, both citizens of the United States, residing at Philadelphia, in the county of Philadelphia and State of Pennsylvania, have invented certain new and useful Improvements in Combined Cooking and Heating Stoves or Ranges, of which the following is a specification.

This invention relates to a stove or range adapted for both cooking and house heating purposes, or which may be employed solely as a heater, as desired.

The object of the invention is to provide a combination heating and cooking stove or range embodying improved means for heating water or air for house warming purposes, and improved means for effectually utilizing the heat for either cooking or house warming, and directing the course of the products of combustion for either purpose so as to utilize all the available heat units of the fuel.

A further object of the invention is to provide a construction of heating means which may be employed with beneficial results in hot water or hot air furnaces.

The invention consists of the features of construction, combination and arrangement of parts hereinafter fully described and claimed, reference being had to the accompanying drawings, in which:

Figure 1 is a sectional plan view of a stove or range embodying the invention. Fig. 2 is a vertical section on line 2—2 of Fig. 1. Fig. 3 is a rear elevation of the stove with the rear casing partially broken away. Fig. 4 is a horizontal section on line 4—4 of Fig. 3. Fig. 5 is a vertical section on line 5—5 of Fig. 1. Fig. 6 is a vertical section showing a modification. Fig. 7 is a section on line 7—7 of Fig. 6.

Referring to the drawings, 1 designates the body of a cooking and heating stove or range, to which the invention is shown applied in the present instance; 2, the oven; 3, the fire-box; 4, the grate; 5, the ash-pit; 6, the horizontal combustion space above the oven; 7, the flue or passage connecting the same with the top of the fire-box; 8, the down draft flue between one of the side walls of the body and the outer side wall 9 of the oven; 10, the heat circulating space between the oven and bottom of the body divided by the diagonal partition 11 into inlet and discharge portions 12 and 13 in communication through a passage 14; 15, an outlet or draft opening in the rear wall of the body and communicating with said portion 13 of the space 10; and 16, 17, 18 and 19, the oven, fire-box, ash-pit and clean-out doors. The construction thus far described may be that common to ordinary cooking stoves or ranges, modified in arrangement according to the principle of the present invention, as hereinafter described.

Arranged between the inner sides of the fire-box and oven and spaced from the latter is a heating chamber 20, shown in Figs. 1 to 5, inclusive, in the nature of a water back, one side of which is lined by the usual fire-brick or clay and forms the inner side wall of the fire-box. The space 21 between this chamber and the oven provides a vertical flue co-extensive in depth with the fire-box, said flue being closed at its base and top and having at its rear a draft opening or outlet 22 formed in the back wall of the body. The flue also communicates at the front with the fire-box through lateral ports 23. A similar heating chamber 24, also shown in Figs. 1 to 5, inclusive, in the form of a water back may be arranged between the outer side of the fire-box and adjacent side of the body and spaced from the latter to provide a vertical flue 25. This chamber 24, together with the fire-brick lining, may serve, as shown, as the outer wall of the fire-box, and the flue 25, like the flue 21, is closed at its base and top and communicates with the front of the fire-box through a vertical series of lateral ports 26. At its rear the flue 25 is provided with a draft opening or outlet 27 formed in the back wall of the body. Connecting with the heating chambers or water backs are water inlet and discharge pipes 28 and 29, forming part of a circulating system, whereby the water heated in said chambers may be circulated for culinary or heating purposes. It will be apparent that when the draft outlets 22 and 27 are open all the smoke and gases will flow into the flues through the lateral ports 23 and 26 and thence travel rearwardly to the discharge outlets, whereby the entire surface of the wall of each chamber will be subjected to the heat of a swirling current of the smoke and gases, so that a large proportion of the heat units will be utilized to heat the chamber. The water passing through the water backs will accordingly be rapidly and highly heated, allowing a large quantity to be circulated for culinary or heating purposes.

Disposed upon the back of the body is a smoke chamber or casing 28' provided with the usual collar 29' for connection with the smoke pipe 30, through which the products of combustion finally discharge to the atmosphere. Arranged in said chamber or casing are dampers 31, 32 and 33, controlling the respective outlets 15, 22 and 27. The dampers 32 and 33 are connected with a sliding operating rod 34 extending at its outer end to the exterior and provided with a knob 35 for manual actuation, while the damper 31 is carried by a pivoted lever 36. When the rod is drawn outward, the dampers 32 and 33 will be closed to cut off the flow of the gases through the flues 21 and 25, while the damper 31 will be opened to allow all the heat and gases to circulate around the oven. When, on the other hand, the rod is pushed inward, the dampers 32 and 33 will be opened for the passage of the heat and gases through the flues 21 and 25, while the damper 31 will be closed to cut off the flow of heat and gases from about the oven. When the oven is not in use, therefore, the full amount of heat generated may be utilized to heat the contents of the chambers 20 and 24.

Within the broad aspect of the invention within the terms of the appended claims, the oven constitutes a heating space or chamber, as will be readily understood. The chambers 20 and 24 may serve to heat water or air and may be in the form of shells, as shown in Figs. 1 to 5, inclusive, or they may each be formed of spaced plates 37 and 38 and contain a water or air heating coil 39, as shown in Figs. 6 and 7, in which event the terminals of the coil will connect with the pipes 28 and 29 and the inner plate may be provided with an asbestos lining 40. In the construction shown in Figs. 6 and 7, as will be readily understood, the space between the plates forms the flue, the coil itself constituting the chamber. It will be observed that the coil is of such form as to permit ready passage of the gases around the coil through the space between said coil and the walls of the flue, and also longitudinally through the space bounded by the convolutions of the coil and laterally through the spaces between the convolutions of the coil, whereby all of the convolutions will be enveloped by the smoke and gases and the contents thereof rapidly heated.

We claim:

1. A heater comprising a body, a fire-box therein, a vertical flue at one side of said fire-box, said flue having an outlet at its rear end and being in communication at its front end with the fire-box through a vertical series of lateral ports extending the full depth of said flue, a heating chamber subjected to the heat from the fire-box and from the smoke and gases passing through the flue, and a damper controlling said outlet.

2. A heater comprising a body, a fire-box therein, a vertical flue at one side of said fire-box, said flue having an outlet at its rear end and being in communication at its front end with the fire-box through a series of lateral ports extending the full depth of said flue, a heating chamber formed between the fire-box and flue, and a damper controlling said outlet.

3. A heater comprising a body, a fire-box therein, heating chambers at opposite sides of the fire-box, vertical flues associated therewith and communicating with the fire-box, a third heating chamber, a coöperating flue associated therewith and communicating with the fire-box, said flues being provided with outlets, dampers controlling said outlets, and means for simultaneously adjusting the dampers to close the outlets of the two first-named flues and open the outlet of the third-named flue, and vice versa.

4. A heater comprising a body, a fire-box therein, heating chambers at opposite sides of the fire-box, vertical flues associated therewith and communicating at their forward ends with the fire-box through lateral ports, a third heating chamber between one of the first-named heating chambers and its associated flue and one of the walls of the body, a coöperating flue about said third heating chamber and communicating with the fire-box, said flues having outlets at their rear ends, dampers controlling said outlets, and means for simultaneously adjusting the dampers to close the outlets of the two first-named flues and open the outlet of the third-named flue, and vice versa.

5. A heater comprising a body, a fire-box therein, heating chambers at opposite sides of the fire-box, vertical flues associated therewith and communicating at their forward ends with the fire-box through lateral ports, a third heating chamber between one of the first-named heating chambers and its associated flue and one of the walls of the body, a coöperating flue about said third heating chamber and communicating with the fire-box, said flues having outlets at their rear ends, a sliding rod, dampers connected with the rod and adapted for simultaneously opening and closing the outlets of the two first-named flues, a pivoted lever operated by the rod, and a damper operated by said lever to open and close the outlet of the third-named flue when the outlets of the two first-named flues are respectively closed and opened.

In testimony whereof we affix our signatures in presence of two witnesses.

JOHN C. GALLAGHER.
HUGH P. GARVEY.

Witnesses:
JAS. B. McCONNELL,
GEORGE P. MACCONAGHY.

Copies of this patent may be obtained for five cents each, by addressing the "Commissioner of Patents, Washington, D. C."